(12) United States Patent  (10) Patent No.: US 8,782,263 B1
Nightingale et al.  (45) Date of Patent: Jul. 15, 2014

(54) AUTHENTICATED SESSION CONTROLLER

(75) Inventors: Michael Nightingale, Pasadena, CA (US); Bob Hickman, Simi Valley, CA (US); Jackson Barrett Dunstan, Sherman Oaks, CA (US)

(73) Assignee: Disney Enterprises, Inc., Burbank, CA (US)

(*) Notice: Subject to any disclaimer, the term of this patent is extended or adjusted under 35 U.S.C. 154(b) by 200 days.

(21) Appl. No.: 13/452,566

(22) Filed: Apr. 20, 2012

(51) Int. Cl.
*G06F 15/16* (2006.01)

(52) U.S. Cl.
USPC ............ 709/229; 709/204; 709/225; 709/227

(58) Field of Classification Search
USPC ......... 709/229, 225, 201, 227–228, 204–205; 715/757, 751, 753, 758; 463/29
See application file for complete search history.

(56) References Cited

U.S. PATENT DOCUMENTS

| | | | |
|---|---|---|---|
| 8,145,516 B2 * | 3/2012 | Blanchard et al. ........... 705/7.12 |
| 2003/0177187 A1 * | 9/2003 | Levine et al. ................ 709/205 |
| 2009/0089687 A1 * | 4/2009 | Lecomte et al. .............. 715/760 |
| 2013/0014033 A1 * | 1/2013 | Hamick et al. ............... 715/757 |
| 2013/0065861 A1 * | 3/2013 | Wu et al. ....................... 514/119 |
| 2013/0232199 A1 * | 9/2013 | Sproule et al. ............... 709/204 |

* cited by examiner

*Primary Examiner* — Abdullahi Salad
(74) *Attorney, Agent, or Firm* — Pillsbury Winthrop Shaw Pittman LLP

(57) ABSTRACT

A single client session may be managed such that two or more virtual instances are presented without regard to technologies of the different virtual instances. Individual ones of the two or more virtual instances may be of a virtual environment or a virtual space. A first virtual instance may be loaded into the client session responsive to a user being authenticated for the first virtual instance based on received authentication information. A second virtual instance may then be loaded into the client session responsive to the user being authenticated for the second virtual instance based on the same received authentication information. Information associated with the user, information associated with a user character controlled by the user, and/or other instance services may be provided to the first virtual instance and/or the second virtual instance. Individual ones of the virtual instances may be monitored for a runtime error and/or memory abuse.

20 Claims, 2 Drawing Sheets

AUTHENTICATED SESSION CONTROLLER

FIELD OF THE DISCLOSURE

This disclosure relates to managing a single client session in which two or more virtual instances are presented without regard to technologies of the different virtual instances, wherein individual ones of the two or more virtual instances are of a virtual environment or a virtual space.

BACKGROUND

In some existing virtual worlds, users can play games created by third parties. In existing systems, however, the third-party games may be limited to the same technology as that used for the virtual worlds in which they are played. For example, if a given virtual world uses Flash technology, a third-party game played in that virtual world may be restricted to Flash. Furthermore, virtual world providers may not be in control of games played within the virtual world with respect to memory usage, runtime errors, and/or other aspects of game control. Additionally, user authentication may be convoluted in that separate user authentications may be required for a virtual world and games played within that virtual world.

SUMMARY

One aspect of the disclosure relates to a system configured to manage a single client session in which two or more virtual instances are presented without regard to technologies of the different virtual instances, in accordance with one or more implementations. Individual ones of the two or more virtual instances may be of a virtual environment or a virtual space. According to various implementations, technologies of the different virtual instances may include one or more of Flash, Flash Lite, ActionScript, ECMAScript, JavaScript, and/or other suitable technologies. By way of non-limiting example, an online game based on ActionScript may be accessed via and/or played within a virtual world based on Flash, in some implementations. As further non-limiting illustration of various implementations, a virtual world may be accessed via a game environment; several successive games may be accessed via games accessed within a virtual world; and/or a virtual world may be re-accessed from a game that was initially accessed via that virtual world. Exemplary implementations may facilitate monitoring health of virtual instances with respect to memory usage, runtime errors, and/or other aspects of game control. To illustrate, a game accessed via and/or played within a virtual world may be monitored such that if it crashes, presentation of the virtual world may be resumed. User authentication may be centralized in some implementations such that after a user is authenticated for a virtual world, no further input may be required from the user to authenticate the user for a game accessed via and/or played within the virtual world.

In some implementations, the system may include one or more servers. The server(s) may be configured to communicate with one or more client computing platform(s) 104 according to a client/server architecture. The client computing platform(s) 104 may present the virtual instances via a client session. A client session may include a browser session of a browser (e.g., a web browser), a dedicated application, and/or other host environments configured to present virtual instances. The client session may be configured to facilitate access by the users to the system and/or the virtual instances via the client computing platform(s). The server(s) may be configured to interface with one or more third-party servers configured to execute instances of a virtual space and/or virtual environment, and to provide those instance to the server(s). In some implementations, the server(s) may interface with the third-party server(s) via one or more application programming interfaces.

The server(s) may be configured to execute one or more computer program modules. The computer program modules may include one or more of a space module, an environment module, a session management module, an authentication module, a technology adaptor module, an instance services module, an instance monitoring module, and/or other modules.

The space module may be configured to implement an instance of a virtual space to determine view information defining views of the instance of the virtual space for presentation to users in the client session. According to various implementations, the space module may be configured to receive the instance of the virtual space from one or more third-party servers, and/or the space module may be configured to execute the instance of a virtual space. The views may then be communicated (e.g., via streaming, via object/position data, and/or other information) from the server(s) to client computing platform(s) for presentation to users. The view determined and/or transmitted to a given client computing platform may correspond to a user character being controlled by a user via the given client computing platform.

The instance of the virtual space may comprise a simulated space that is accessible by users via clients (e.g., client computing platform(s) 104) that present the views of the virtual space to a user. Within the instance(s) of the virtual space, users may control characters, objects, simulated physical phenomena (e.g., wind, rain, earthquakes, and/or other phenomena), and/or other elements within the virtual space to interact with the virtual space and/or each other. The user characters may include avatars. The user may have an "inventory" of virtual goods and/or currency that the user can use (e.g., by manipulation of a user character or other user controlled element, and/or other items) within the virtual space.

The environment module may be configured to implement an instance of a virtual environment to determine view information defining views of the instance of the virtual environment for presentation to users in the client session. According to various implementations, the environment module may be configured to receive the instance of the virtual environment from one or more third-party servers, and/or the environment module may be configured to execute the instance of a virtual environment. As used herein, a "virtual environment" may include a virtual space, one or more interactive, electronic social media, and/or other virtual environments. Interactive, electronic social media may include one or more of a social network, a virtual space, a micro-blogging service, a blog service (or host), a browser-based game, a multi-player mobile game, a file (e.g., image file, video file, and/or other files) sharing service, a messaging service, a message board, a forum, and/or other electronically distributed media that are scalable and enable interaction between the users.

The session management module may act as a client session manager. In some implementations, the session management module may be configured to manage a client session to present virtual instances via a browser. The session management module may be configured to receive a request to load one or more virtual instances into the client session. The virtual instances may include a first virtual instance and a second virtual instance. The session management module may be configured to load the first virtual instance and/or the second virtual instance into the client session responsive to a user being authenticated. In some implementations, a request to load the second virtual instance may be received via the first virtual instance. For example, a virtual world may be loaded as the first virtual instance in which a user may choose to engage in a game as the second virtual instance.

The authentication module may be configured to receive authentication information via the browser responsive to the request to load the first virtual instance. The authentication module may be configured to authenticate the user for the first virtual instance based on the received authentication information. The session management module may be configured to load the first virtual instance into the client session responsive to the user being authenticated for the first virtual instance. The authentication module may be configured to authenticate the user for the second virtual instance based on the same authentication information received to authenticate the user for the first virtual instance. In some implementations, the authentication information may include a persistent authentication token associated with the user that can be used to authenticate the user for two or more virtual instances. The session management module may be configured to load the second virtual instance into the browser responsive to the user being authenticated for the second virtual instance.

According to some implementations, session management module 110 may be configured to kill (or otherwise close) the first virtual instance at a first current state prior to loading the second virtual instance into the client session, while in some implementations both the first virtual instance and the second virtual instance may be concurrently loaded into the client session. In implementations where only one virtual instance is loaded into the client session at a given time, the session management module may be configured receive a request to reload the first virtual instance after the first virtual instance has been killed. The session management module may then reload the first virtual instance at the first current state responsive to receiving the request to reload the first virtual instance. The session management module may be configured to kill the second virtual instance at a second current state prior to reloading the first virtual instance.

The technology adaptor module may be configured to provide an interface between the session management module and individual ones of the two or more virtual instances such that a given virtual instance is loaded into the client session without regard to a technology of the given virtual instance. According to various implementations, the technology of the given virtual instance may include one or more of Flash, Flash Lite, ActionScript, ECMAScript, JavaScript, and/or other suitable technologies. By way of non-limiting example, an online game based on ActionScript may be accessed via and/or played within a virtual world based on Flash, in some implementations. The technology adaptor module may provide libraries corresponding to different technologies, which may be utilized by the space module and/or the environment module to facilitate loading a virtual instance into the client session by the session management module.

The instance services module may be configured to provide instance services to virtual instances. The instance services may include information associated with the user and/or information associated with a user character controlled by the user. By way of non-limiting example, the instance services may include one or more of a leader board, an inventory associated with the user and/or the user character, a profile of the user, an avatar associated with the user, and/or other information associated with the user and/or information associated with a user character controlled by the user. Providing a common set of instance services across two or more virtual instances may facilitate enhanced consistency for the user experience. For example, a single virtual currency account may be accessed and/or utilized in two or more different virtual instances.

The instance monitoring module may be configured to monitor individual ones of the virtual instances. The instance monitoring module may monitor a given virtual instance for a runtime error, memory usage, memory abuse, and/or other aspects of virtual instance operation. In some implementations, the instance monitoring module may kill and/or effectual killing a given virtual instance responsive to the given virtual instance meeting a condition associated with a monitored aspect of virtual instance operation. For example, a virtual instance may be killed responsive to the virtual instance crashing due to a runtime error. As another example, a virtual instance using an excessive amount of memory may be killed. The instance monitoring module may be configured to clean up memory once a virtual instance has been killed or otherwise closed.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
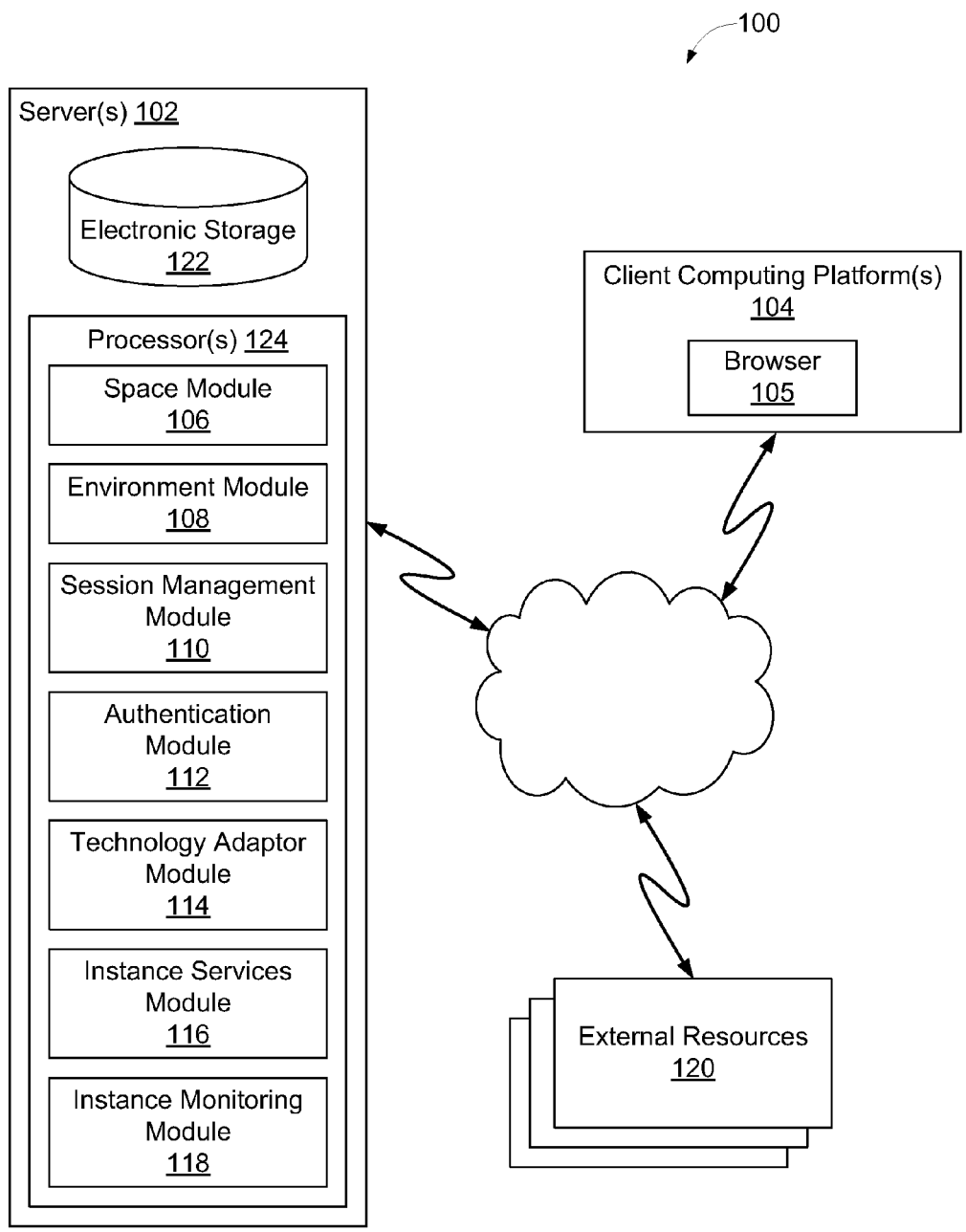
FIG. 1 illustrates a system configured to manage a single client session in which two or more virtual instances are presented without regard to technologies of the different virtual instances, in accordance with one or more implementations.

FIG. 1 illustrates a system 100 configured to manage a single client session in which two or more virtual instances are presented without regard to technologies of the different virtual instances, in accordance with one or more implementations. Individual ones of the two or more virtual instances may be of a virtual environment or a virtual space. According to various implementations, technologies of the different virtual instances may include one or more of Flash, Flash Lite, ActionScript, ECMAScript, JavaScript, and/or other suitable technologies. By way of non-limiting example, an online game based on ActionScript may be accessed via and/or played within a virtual world based on Flash, in some implementations. As further non-limiting illustration of various implementations, a virtual world may be accessed via a game environment; several successive games may be accessed via games accessed within a virtual world; and/or a virtual world may be re-accessed from a game that was initially accessed via that virtual world. Exemplary implementations may facilitate monitoring health of virtual instances with respect to memory usage, runtime errors, and/or other aspects of game control. To illustrate, a game accessed via and/or played within a virtual world may be monitored such that if it crashes, presentation of the virtual world may be resumed. User authentication may be centralized in some implementations such that after a user is authenticated for a virtual world, no further input may be required from the user to authenticate the user for a game accessed via and/or played within the virtual world.

In some implementations, system 100 may include one or more servers 102. The server 102 may be configured to communicate with one or more client computing platform(s) 104 according to a client/server architecture. The client computing platform(s) 104 may present the virtual instances via a client session. A client session may include a browser session of a browser 105 (e.g., a web browser), a dedicated application, and/or other host environments configured to present virtual instances. Generally speaking, a browser session may be a continuous period of user activity in browser 105. The client session may be configured to facilitate access by the users to system 100 and/or the virtual instances via client computing platforms 104. The server(s) 102 may be configured to interface with one or more third-party servers (not depicted) configured to execute instances of a virtual space and/or virtual environment, and to provide those instance to server(s) 102. In some implementations, server(s) 102 may interface with the third-party server(s) via one or more application programming interfaces.

The server(s) 102 may be configured to execute one or more computer program modules. The computer program modules may include one or more of a space module 106, an environment module 108, a session management module 110, an authentication module 112, a technology adaptor module 114, an instance services module 116, an instance monitoring module 118, and/or other modules.

The space module 106 may be configured to implement an instance of a virtual space to determine view information defining views of the instance of the virtual space for presentation to users in the client session. According to various implementations, space module 106 may be configured to receive the instance of the virtual space from one or more third-party servers, and/or space module 106 may be configured to execute the instance of a virtual space. The views may then be communicated (e.g., via streaming, via object/position data, and/or other information) from server(s) 102 to client computing platform(s) 104 for presentation to users. The view determined and/or transmitted to a given client computing platform 104 may correspond to a user character being controlled by a user via the given client computing platform 104. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platform(s) 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual space are determined and/or transmitted by space module 106 is not intended to be limiting. The space module 106 may be configured to express the virtual space in a more limited, or more rich, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platform(s) 104. The users may interact with each other through communications exchanged within the virtual space. Such communications may include one or more of textual chat, instant messages, private messages, voice communications, and/or other communications. Communications may be received and entered by the users via their respective client computing platform(s) 104. Communications may be routed to and from the appropriate users through server(s) 102 (e.g., through space module 106) and/or through third-party servers.

The environment module 108 may be configured to implement an instance of a virtual environment to determine view information defining views of the instance of the virtual environment for presentation to users in the client session. According to various implementations, environment module 108 may be configured to receive the instance of the virtual environment from one or more third-party servers, and/or environment module 108 may be configured to execute the instance of a virtual environment.

As used herein, a "virtual environment" may include a virtual space, one or more interactive, electronic social media, and/or other virtual environments. Interactive, electronic social media may include one or more of a social network, a virtual space, a micro-blogging service, a blog service (or host), a browser-based game, a multi-player mobile game, a file (e.g., image file, video file, and/or other files) sharing service, a messaging service, a message board, a forum, and/or other electronically distributed media that are scalable and enable interaction between the users. Some non-limiting specific examples of interactive, electronic social media may include the micro-blogging service provided by Twitter™, the social network provided by Facebook™, the social network provided by MySpace™, the social network provided by Foursquare®, the virtual world provided by SecondLife®, the massively multi-player online game provided by World of Warcraft®, the file sharing service provided by Flickr®, Blogger, YouTube, PlayStation® Home, Xbox® Live, and/or other interactive electronic social media.

The session management module 110 may act as a client session manager. In some implementations, session management module 110 may be configured to manage a client session to present virtual instances via a browser. The session management module 110 may be configured to receive a request to load one or more virtual instances into the client session. The virtual instances may include a first virtual instance and a second virtual instance. The session management module 110 may be configured to load the first virtual instance and/or the second virtual instance into the client session responsive to a user being authenticated. In some implementations, a request to load the second virtual instance may be received via the first virtual instance. For example, a virtual world may be loaded as the first virtual instance in which a user may choose to engage in a game as the second virtual instance.

The authentication module 112 may be configured to receive authentication information via the browser responsive to the request to load the first virtual instance. The authentication module 112 may be configured to authenticate the user for the first virtual instance based on the received authentication information. As alluded to above, session management module 110 may be configured to load the first virtual instance into the client session responsive to the user being authenticated for the first virtual instance. The authentication module 112 may be configured to authenticate the user for the second virtual instance based on the same authentication information received to authenticate the user for the first virtual instance. In some implementations, the authentication information may include a persistent authentication token associated with the user that can be used to authenticate the user for two or more virtual instances. The session management module 110 may be configured to load the second virtual instance into the browser responsive to the user being authenticated for the second virtual instance.

According to some implementations, session management module 110 may be configured to kill (or otherwise close) the first virtual instance at a first current state prior to loading the second virtual instance into the client session, while in some implementations both the first virtual instance and the second virtual instance may be concurrently loaded into the client session. In implementations where only one virtual instance is loaded into the client session at a given time, session management module 110 may be configured receive a request to reload the first virtual instance after the first virtual instance has been killed. The session management module 110 may then reload the first virtual instance at the first current state responsive to receiving the request to reload the first virtual instance. The session management module 110 may be configured to kill the second virtual instance at a second current state prior to reloading the first virtual instance.

The technology adaptor module 114 may be configured to provide an interface between session management module 110 and individual ones of the two or more virtual instances such that a given virtual instance is loaded into the client session without regard to a technology of the given virtual instance. According to various implementations, the technology of the given virtual instance may include one or more of Flash, Flash Lite, ActionScript, ECMAScript, JavaScript, and/or other suitable technologies. By way of non-limiting example, an online game based on ActionScript may be accessed via and/or played within a virtual world based on Flash, in some implementations. The technology adaptor module 114 may provide libraries corresponding to different technologies, which may be utilized by space module 106 and/or environment module 108 to facilitate loading a virtual instance into the client session by session management module 110.

The instance services module 116 may be configured to provide instance services to virtual instances. The instance services may include information associated with the user and/or information associated with a user character controlled by the user. By way of non-limiting example, the instance services may include one or more of a leader board, an inventory associated with the user and/or the user character, a profile of the user, an avatar associated with the user, and/or other information associated with the user and/or information associated with a user character controlled by the user. Providing a common set of instance services across two or more virtual instances may facilitate enhanced consistency for the user experience. For example, a single virtual currency account may be accessed and/or utilized in two or more different virtual instances.

The instance monitoring module 118 may be configured to monitor individual ones of the virtual instances. The instance monitoring module 118 may monitor a given virtual instance for a runtime error, memory usage, memory abuse, and/or other aspects of virtual instance operation. In some implementations, instance monitoring module 118 may kill and/or effectual killing a given virtual instance responsive to the given virtual instance meeting a condition associated with a monitored aspect of virtual instance operation. For example, a virtual instance may be killed responsive to the virtual instance crashing due to a runtime error. As another example, a virtual instance using an excessive amount of memory may be killed. The instance monitoring module 118 may be configured to clean up memory once a virtual instance has been killed or otherwise closed.

In some implementations, server(s) 102, client computing platform(s) 104, and/or external resources 120 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 120 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 120, and/or provide other functionality attributed herein to client computing platform(s) 104. By way of non-limiting example, the given client computing platform 104 may include one or more of a desktop computer, a laptop computer, a handheld computer, a NetBook, a Smartphone, a gaming console, and/or other computing platforms.

The external resources 120 may include sources of information, hosts and/or providers of virtual spaces and/or virtual environments outside of system 100, third-party servers, external entities participating with system 100, and/or other resources. In some implementations, some or all of the functionality attributed herein to external resources 120 may be provided by resources included in system 100, and/or vice versa.

The server(s) 102 may include electronic storage 122, one or more processors 124, and/or other components. The server(s) 102 may include communication lines, or ports to enable the exchange of information with a network and/or other computing platforms. Illustration of server(s) 102 in FIG. 1 is not intended to be limiting. The server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 122 may comprise electronic storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage xx may include one or more virtual storage resources (e.g., cloud storage, a virtual private network, and/or other virtual storage resources). Electronic storage 122 may store software algorithms, information determined by processor(s) 124, information received from server(s) 102, information received from client computing platform(s) 104, and/or other information that enables server(s) 102 to function as described herein.

Processor(s) 104 may be configured to provide information processing capabilities in server(s) 102. As such, client computing platform(s) 104 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. The processor(s) 124 may be configured to execute modules 106, 108, 110, 112, 114, 116, 118, and/or other modules. The processor(s) 124 may be configured to execute modules 106, 108, 110, 112, 114, 116, 118, and/or other modules by software; hardware; firmware; some combination of software, hardware, and/or firmware; and/or other mechanisms for configuring processing capabilities on processor(s) 124.

It should be appreciated that although modules 106, 108, 110, 112, 114, 116, and 118 are illustrated in FIG. 1 as being co-located within a single processing unit, in implementations in which processor(s) 124 includes multiple processing units, one or more of modules 106, 108, 110, 112, 114, 116, and/or 118 may be located remotely from the other modules. The description of the functionality provided by the different modules 106, 108, 110, 112, 114, 116, and/or 118 described herein is for illustrative purposes, and is not intended to be limiting, as any of modules 106, 108, 110, 112, 114, 116, and/or 118 may provide more or less functionality than is described. For example, one or more of modules 106, 108, 110, 112, 114, 116, and/or 118 may be eliminated, and some or all of its functionality may be provided by other ones of modules 106, 108, 110, 112, 114, 116, and/or 118. As another example, processor(s) 124 may be configured to execute one or more additional modules that may perform some or all of the functionality attributed below to one of modules 106, 108, 110, 112, 114, 116, and/or 118.

Figure 2:
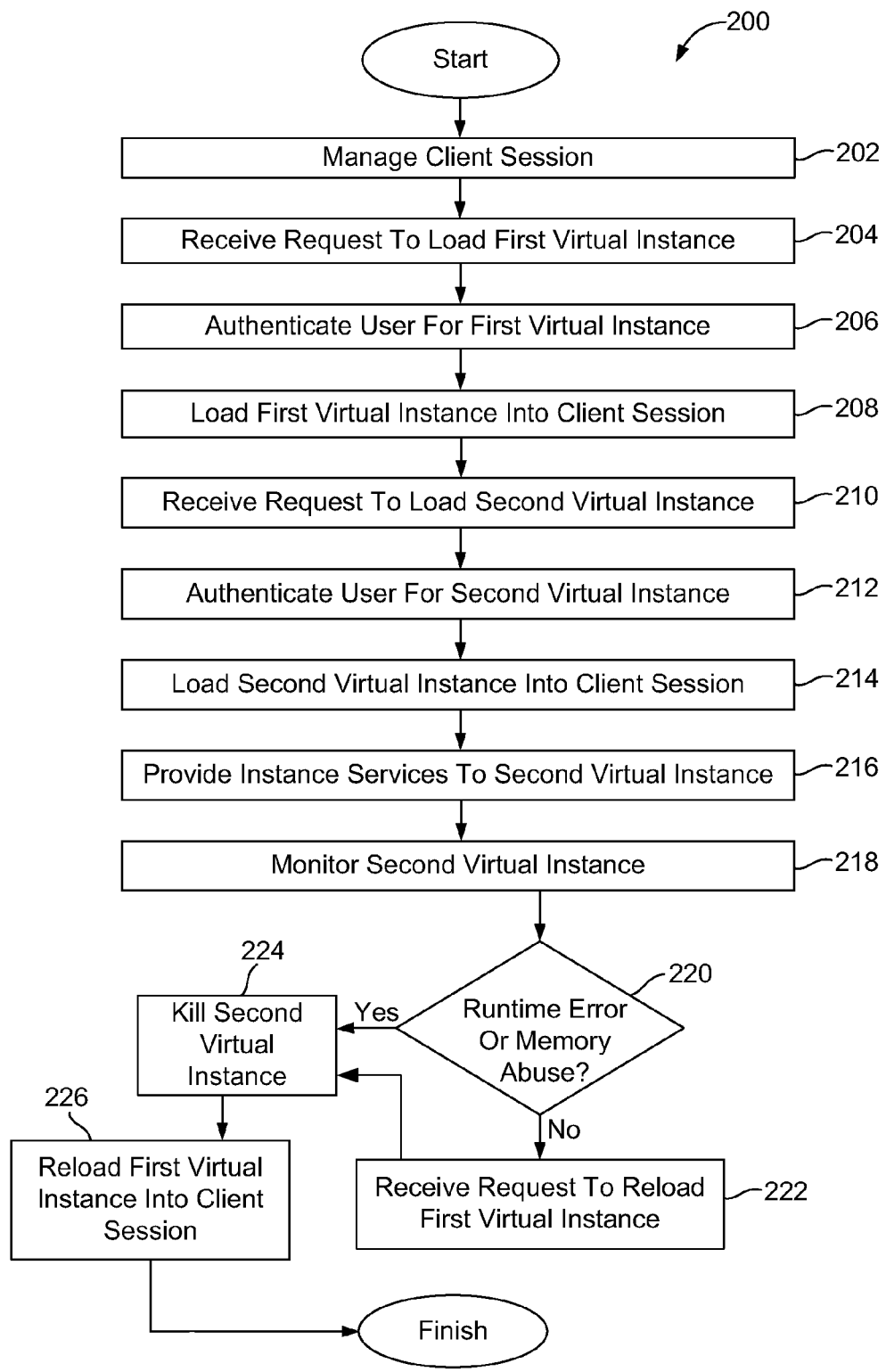
FIG. 2 illustrates a method for managing a single client session in which two or more virtual instances are presented without regard to technologies of the different virtual instances, in accordance with one or more implementations.

FIG. 2 illustrates a method 200 for managing a single client session in which two or more virtual instances are presented without regard to technologies of the different virtual instances, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, a client session may be managed to present virtual instances via a browser. Operation 202 may include loading a session manager into the client session. Operation 202 may be performed by a session management module that is the same as or similar to session management module 110, in accordance with one or more implementations.

At an operation 204, a request to load a first virtual instance into the client session may be received. Operation 204 may be performed by a session management module that is the same as or similar to session management module 110, in accordance with one or more implementations.

At an operation 206, a user may be authenticated for the first virtual instance based on the received authentication information. Operation 208 may include receiving authentication information via the browser responsive to the request to load the first virtual instance. The authentication may be inputted into the client session by a user. Operation 206 may be performed by an authentication module that is the same as or similar to authentication module 112, in accordance with one or more implementations.

At an operation 208, the first virtual instance may be loaded into the client session responsive to the user being authenticated for the first virtual instance. Operation 208 may be performed by a session management module that is the same as or similar to session management module 110, in accordance with one or more implementations.

At an operation 210, a request may be received to load a second virtual instance into the client session. Operation 210 may be performed by a session management module that is the same as or similar to session management module 110, in accordance with one or more implementations.

At an operation 212, the user may be authenticated for the second virtual instance based on the same authentication information used at operation 206. Operation 212 may be performed by an authentication module that is the same as or similar to authentication module 112, in accordance with one or more implementations.

At an operation 214, the second virtual instance may be loaded into the client session responsive to the user being authenticated for the second virtual instance. Loading and/or running the second virtual instance in the client session may involve technology adaptor module 114 in implementations where the first virtual instance and the second virtual instance are based on different technologies. Operation 214 may be performed by a session management module that is the same as or similar to session management module 110, in accordance with one or more implementations.

At an operation 216, instance services may be provided to the first virtual instance and/or the second virtual instance. The instance services may include information associated with the user and/or information associated with a user character controlled by the user in the first virtual instance and/or the second virtual instance. Operation 216 may be performed by an instance services module that is the same as or similar to instance services module 116, in accordance with one or more implementations.

At an operation 218, the second virtual instance may be monitored. In some implementations, the second virtual instance may be monitored for a runtime error and/or memory abuse. Operation 218 may be performed by an instance monitoring module that is the same as or similar to instance monitoring module 118, in accordance with one or more implementations.

At an operation 220, a determination may be made as to whether there is a runtime error and/or memory abuse associated with the second virtual instance. Upon a negative determination, method 200 may proceed to operation 222. Upon a positive determination, method 200 may proceed to operation 224. Operation 220 may be performed by an instance monitoring module that is the same as or similar to instance monitoring module 118, in accordance with one or more implementations.

At an operation 222, a request may be received to reload the first virtual instance. Operation 222 may be performed by a session management module that is the same as or similar to session management module 110, in accordance with one or more implementations.

At an operation 224, the second virtual instance may be killed. Operation 224 may be performed by an instance monitoring module that is the same as or similar to instance monitoring module 118, in accordance with one or more implementations.

At an operation 226, the first virtual instance may be reloaded into the client session. Operation 226 may be performed by a session management module that is the same as or similar to session management module 110, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to manage a single client session in which two or more virtual instances are presented without regard to technologies of the different virtual instances, individual ones of the two or more virtual instances being of a virtual environment or a virtual space, the system comprising:
   physical memory with computer readable instructions stored thereon;
   one or more physical processors configured by the computer readable instructions stored on the physical memory to:
      manage a client session to present virtual instances via a browser, wherein the session management module is further configured to receive a request to load a first virtual instance into the client session;
      receive authentication information via the browser responsive to the request to load the first virtual instance, and to authenticate a user for the first virtual instance based on the received authentication information, wherein the session management module is further configured to load the first virtual instance into the client session responsive to the user being authenticated for the first virtual instance;
      receive a request to load a second virtual instance into the client session;
      to authenticate the user for the second virtual instance based on the received authentication information, wherein the session management module is further configured to load the second virtual instance into the client session responsive to the user being authenticated for the second virtual instance; and
      provide instance services to virtual instances including the first virtual instance and/or the second virtual instance, the instance services including information associated with the user and/or information associated with a user character controlled by the user.

2. The system of claim 1, wherein technologies of the different virtual instances include one or more of Flash, Flash Lite, ActionScript, ECMAScript, or JavaScript.

3. The system of claim 1, wherein the one or more physical processors are further configured by the computer readable instructions stored on the physical memory to provide an interface between the one or more physical processors and individual ones of the two or more virtual instances such that a given virtual instance is loaded into the client session without regard to a technology of the given virtual instance.

4. The system of claim 3, wherein providing such interface includes providing libraries corresponding to one or more different technologies.

5. The system of claim 1, wherein the one or more physical processors are further configured by the computer readable instructions stored on the physical memory to:
   monitor individual ones of the virtual instances for a runtime error and/or memory abuse, and
   kill a given virtual instance responsive to the given virtual instance meeting a condition associated with a runtime error and/or memory abuse.

6. The system of claim 1, wherein the authentication information includes a persistent authentication token associated with the user that can be used to authenticate the user for each of the two or more virtual instances.

7. The system of claim 1, wherein the one or more physical processors are further configured by the computer readable instructions stored on the physical memory to kill the first virtual instance at a first current state prior to loading the second virtual instance into the client session.

8. The system of claim 7, wherein the one or more physical processors are further configured by the computer readable instructions stored on the physical memory to receive a request to reload the first virtual instance after the first virtual instance has been killed, and to reload the first virtual instance at the first current state responsive to receiving the request to reload the first virtual instance.

9. The system of claim 8, wherein the one or more physical processors are further configured by the computer readable instructions stored on the physical memory to kill the second virtual instance at a second current state prior to reloading the first virtual instance.

10. The system of claim 1, wherein the instance services include one or more of a leader board, an inventory associated with the user and/or the user character, a profile of the user, or an avatar associated with the user.

11. A computer-implemented method for managing a single client session in which two or more virtual instances are presented without regard to technologies of the different virtual instances, individual ones of the two or more virtual instances being of a virtual environment or a virtual space, the method being implemented in a computer system comprising one or more processors configured to execute computer program modules, the method comprising:
    managing a client session to present virtual instances via a browser;
    receiving a request to load a first virtual instance into the client session;
    receiving authentication information via the browser responsive to the request to load the first virtual instance;
    authenticating a user for the first virtual instance based on the received authentication information;
    loading the first virtual instance into the client session responsive to the user being authenticated for the first virtual instance;
    receiving a request to load a second virtual instance into the client session;
    authenticating the user for the second virtual instance based on the received authentication information;
    loading the second virtual instance into the client session responsive to the user being authenticated for the second virtual instance; and
    providing instance services to virtual instances including the first virtual instance and/or the second virtual instance, the instance services including information associated with the user and/or information associated with a user character controlled by the user.

12. The method of claim 11, wherein technologies of the different virtual instances include one or more of Flash, Flash Lite, ActionScript, ECMAScript, or JavaScript.

13. The method of claim 11, further comprising providing an interface that adapts between different technologies such that a given virtual instance is loaded into the client session without regard to a technology of the given virtual instance.

14. The method of claim 13, wherein providing the interface includes providing libraries corresponding to one or more different technologies.

15. The method of claim 11, further comprising:
    monitoring individual ones of the virtual instances for a runtime error and/or memory abuse; and
    killing a given virtual instance responsive to the given virtual instance meeting a condition associated with a runtime error and/or memory abuse.

16. The method of claim 11, wherein the authentication information includes a persistent authentication token associated with the user that can be used to authenticate the user for each of the two or more virtual instances.

17. The method of claim 11, further comprising killing the first virtual instance at a first current state prior to loading the second virtual instance into the client session.

18. The method of claim 17, further comprising:
    receiving a request to reload the first virtual instance after the first virtual instance has been killed; and
    reloading the first virtual instance at the first current state responsive to receiving the request to reload the first virtual instance.

19. The method of claim 18, further comprising killing the second virtual instance at a second current state prior to reloading the first virtual instance.

20. The method of claim 11, wherein the instance services include one or more of a leader board, an inventory associated with the user and/or the user character, a profile of the user, or an avatar associated with the user.

* * * * *